(12) United States Patent
Hosko et al.

(10) Patent No.: US 12,040,150 B2
(45) Date of Patent: Jul. 16, 2024

(54) CIRCUIT BREAKER WITH ADVANCED HEALTH DIAGNOSTICS

(71) Applicant: EATON INTELLIGENT POWER LIMITED, Dublin (IE)

(72) Inventors: Daniel A. Hosko, Pittsburgh, PA (US); John E. Downs, Hopedale, OH (US); Brian J. Schaltenbrand, Pittsburgh, PA (US); Paul Richard Rakus, Coraopolis, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/071,022

(22) Filed: Nov. 29, 2022

(65) Prior Publication Data

US 2024/0177958 A1    May 30, 2024

(51) Int. Cl.
*H01H 71/04* (2006.01)
*H01H 13/12* (2006.01)
*H02H 3/04* (2006.01)
*H02H 3/33* (2006.01)

(52) U.S. Cl.
CPC ............ *H01H 71/04* (2013.01); *H01H 13/12* (2013.01); *H02H 3/044* (2013.01); *H01H 2071/044* (2013.01); *H02H 3/335* (2013.01)

(58) Field of Classification Search
CPC .. H01H 13/12; H01H 71/04; H01H 2071/044; H02H 3/044; H02H 3/335
USPC ...................................................... 361/93.2
See application file for complete search history.

(56) References Cited

U.S. PATENT DOCUMENTS

| | | | | |
|---|---|---|---|---|
| 6,080,947 A | * | 6/2000 | Ulerich | H01H 71/04 200/400 |
| 9,318,292 B2 | | 4/2016 | Cazals et al. | |
| 2013/0134982 A1 | * | 5/2013 | Cazals | H01H 11/0062 324/415 |
| 2017/0194113 A1 | * | 7/2017 | Yang | G01R 31/3277 |

(Continued)

OTHER PUBLICATIONS

European Patent Office "International Search Report and Written Opinion", for corresponding International (PCT) Patent Application No. PCT/EP2023/025496, date of mailing of the international search: Jun. 3, 2024, 12 pp.

*Primary Examiner* — Kevin J Comber
(74) *Attorney, Agent, or Firm* — Eckert Seamans Cherin & Mellott, LLC

(57) ABSTRACT

A diagnostic system for monitoring a mechanical trip mechanism of a circuit interrupter provides advanced diagnostics. The trip mechanism comprises a D-shaft that is actuated by the trip unit, an operating mechanism that is actuated by the D-shaft, and a pole shaft that is actuated by the operating mechanism to physically separate the separable contacts. During every opening operation, the diagnostic system determines how much time elapses between the D-shaft beginning to move to its open position and the pole shaft reaching its open position, in order to detect degradation of the trip mechanism as early as possible. This ensures that suboptimal performance is detected even if the trip mechanism is meeting the minimum requirements for acceptable performance. A user is notified once the performance has degraded to a level that is considered concerning before the trip mechanism fails altogether, saving significant time and resources and preventing more widespread damage.

19 Claims, 6 Drawing Sheets

(56) References Cited

U.S. PATENT DOCUMENTS

2019/0189366 A1\* 6/2019 Perrin .................... H01H 71/66
2021/0072315 A1\* 3/2021 Rakus .................. G01R 31/333

\* cited by examiner

CIRCUIT BREAKER WITH ADVANCED HEALTH DIAGNOSTICS

FIELD OF THE INVENTION

The disclosed concept relates generally to circuit interrupters, and in particular, to monitoring systems used to track performance degradation in mechanical trip mechanisms of circuit interrupters.

BACKGROUND OF THE INVENTION

Circuit interrupters, such as for example and without limitation, circuit breakers, are typically used to protect electrical circuitry from damage due to various trip conditions, including an overcurrent condition, such as an overload condition, a short circuit, or another fault condition, such as an arc fault or a ground fault. Referring to FIG. 1, circuit interrupters such as the schematically depicted circuit interrupter 1 are generally structured to be electrically connected between a power source 2 and a load 3 via line and neutral conductors 4, 6. Circuit interrupters typically include separable electrical contacts 8, which operate as a switch. When the separable contacts 8 are in contact with one another in a closed state, current can flow through any circuits connected to the circuit interrupter. When the separable contacts 8 are isolated from one another in an open state, current is prevented from flowing through any circuits connected to the circuit interrupter. Typically, circuit interrupters include a mechanical trip mechanism 10 designed to rapidly open or close the separable contacts 8, and a trip monitoring mechanism, such as an electronic trip unit 12, which uses a current sensor 14 or other type of sensor to detect a number of fault conditions. Upon sensing a fault condition, the trip unit 12 is configured to instruct the mechanical trip mechanism 10 to trip open the separable contacts 8.

Typically, one of the separable contacts 8 is fixed in place and remains stationary, and the other separable contact 8 is part of a movable conductor assembly. When the trip unit 12 detects a fault condition and initiates an opening operation by instructing the mechanical trip mechanism 10 to open the separable contacts 8, the mechanical trip mechanism 10 opens the separable contacts 8 by driving the movable conductor assembly away from the stationary separable contact. The mechanical trip mechanism 10 needs to be capable of driving the movable conductor assembly away from the fixed separable contact quickly in order to mitigate the effects of a fault condition.

Existing circuit breakers generally provide limited information about the wear and tear of individual component mechanisms, such as the mechanical trip mechanism 10 or any of its subcomponents. An operator typically has very limited knowledge about whether the mechanical trip mechanism 10 has degraded and needs to be serviced, until the mechanical trip mechanism 10 has either slowed considerably or completely failed. In addition, the mechanical trip mechanism 10 comprises several components, each of which may degrade at a different rate relative to the others. When a mechanical trip mechanism 10 fails to operate properly, not having advance notice about the failure can make servicing the mechanical trip mechanism 10 time-consuming and inefficient.

There is thus room for improvement in monitoring systems for mechanical trip mechanisms in circuit interrupters.

SUMMARY OF THE INVENTION

These needs, and others, are met by a monitoring system that provides advanced diagnostics for a mechanical trip mechanism of a circuit interrupter. The monitoring system monitors the performance during every opening operation in order to detect degradation of the mechanical trip mechanism as early as possible. Monitoring every opening operation ensures that, even if a mechanical trip mechanism is meeting the minimum requirements for acceptable operating performance, the system becomes aware as soon as performance becomes suboptimal, and can issue notifications to a user once the performance has degraded to a level that is considered concerning before the mechanical trip mechanism fails altogether. Prompting a user to inspect and service the mechanical trip mechanism prior to failure can save significant time and resources, and prevents damage from becoming more widespread, as compared to waiting until the mechanism actually fails.

In accordance with one aspect of the disclosed concept, a circuit interrupter structured to be electrically connected between a power source and a load comprises: a pair of separable contacts comprising a stationary contact and a movable contact disposed between the power source and the load; a trip unit configured to detect trip conditions; a mechanical trip mechanism; and a diagnostic system. The mechanical trip mechanism comprises: a D-shaft structured to be actuated by the trip unit; an operating mechanism structured to be actuated by the D-shaft; and a pole shaft structured to be actuated by the operating mechanism and to move the movable contact between a closed position and an open position. The diagnostic system comprises: a D-shaft sensor structured to be coupled to the D-shaft and to track a position of the D-shaft; a pole shaft sensor structured to be coupled to the pole shaft and to track a position of the pole shaft; and a microprocessor in electrical communication with the D-shaft sensor and the pole shaft sensor. For each opening operation of the circuit interrupter, the microprocessor is configured to: time stamp a first time at which the D-shaft moves to its open position, time stamp a second time at which the pole shaft moves to its open position, determine a mechanism performance time of the mechanical trip mechanism by subtracting the first time from the second time, transmit the mechanism performance time to the trip unit, and determine whether or not the circuit interrupter requires servicing based on the mechanism performance time.

In accordance with another aspect of the disclosed concept, a method of monitoring performance of a mechanical trip mechanism during opening operations of a circuit interrupter comprises: positioning a D-shaft sensor to track a position of a D-shaft of the mechanical trip mechanism; positioning a pole shaft sensor to track a position of a pole shaft of the mechanical trip mechanism; time stamping, with a microprocessor, a first time at which the D-shaft moves to its open position; time stamping, with the microprocessor, a second time at which the pole shaft moves to its open position; determining, with the microprocessor, a mechanism performance time of the mechanical trip mechanism by subtracting the first time from the second time; and determining, with a trip unit of the circuit interrupter, whether or not the circuit interrupter requires servicing based on the mechanism performance time. The D-shaft is configured to be actuated by the trip unit upon detection of a trip condition by the trip unit, an operating mechanism of the mechanical trip mechanism is configured to be actuated by the D-shaft, the pole shaft is configured to be actuated by the operating mechanism, and the pole shaft is configured to open separable contacts of the circuit interrupter.

In accordance with a further aspect of the disclosed concept, a diagnostic system for monitoring performance of a mechanical trip mechanism of a circuit interrupter comprises a D-shaft sensor, a pole shaft sensor, and a microprocessor in electrical communication with the D-shaft sensor and the pole shaft sensor. The mechanical trip mechanism comprises a D-shaft structured to be actuated by a trip unit, an operating mechanism structured to be actuated by the D-shaft, and a pole shaft structured to be actuated by the operating mechanism and to separate a moving separable contact from a stationary separable contact. The D-shaft sensor is structured to be fixedly positioned in proximity to the D-shaft and to track a position of the D-shaft, and the pole shaft sensor is structured to be fixedly positioned in proximity to the pole shaft and to track a position of the pole shaft. For each opening operation of the circuit interrupter, the microprocessor is configured to: time stamp a first time at which the D-shaft moves to its open position, time stamp a second time at which the pole shaft moves to its open position, determine a mechanism performance time of the mechanical trip mechanism by subtracting the first time from the second time, transmit the mechanism performance time to the trip unit, and determine whether or not the circuit interrupter requires servicing based on the mechanism performance time.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
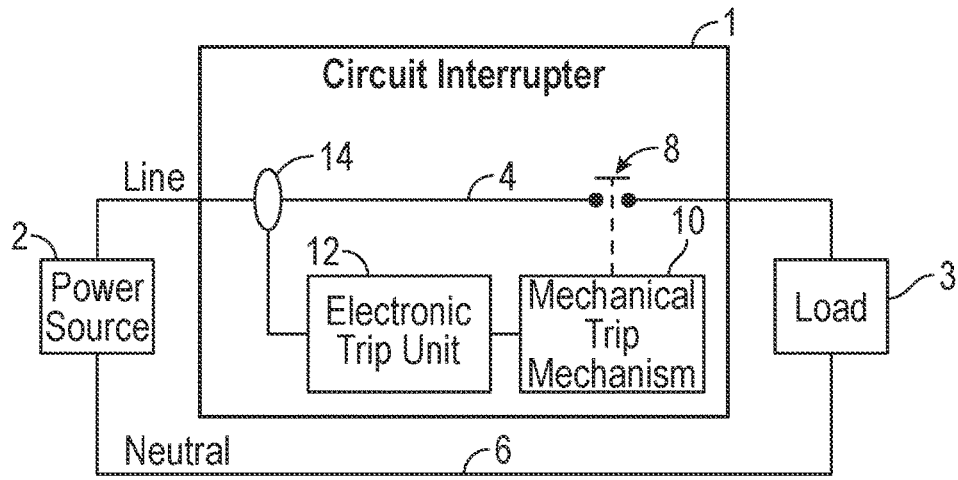
FIG. 1 is a schematic diagram of a circuit interrupter.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

Figure 2:
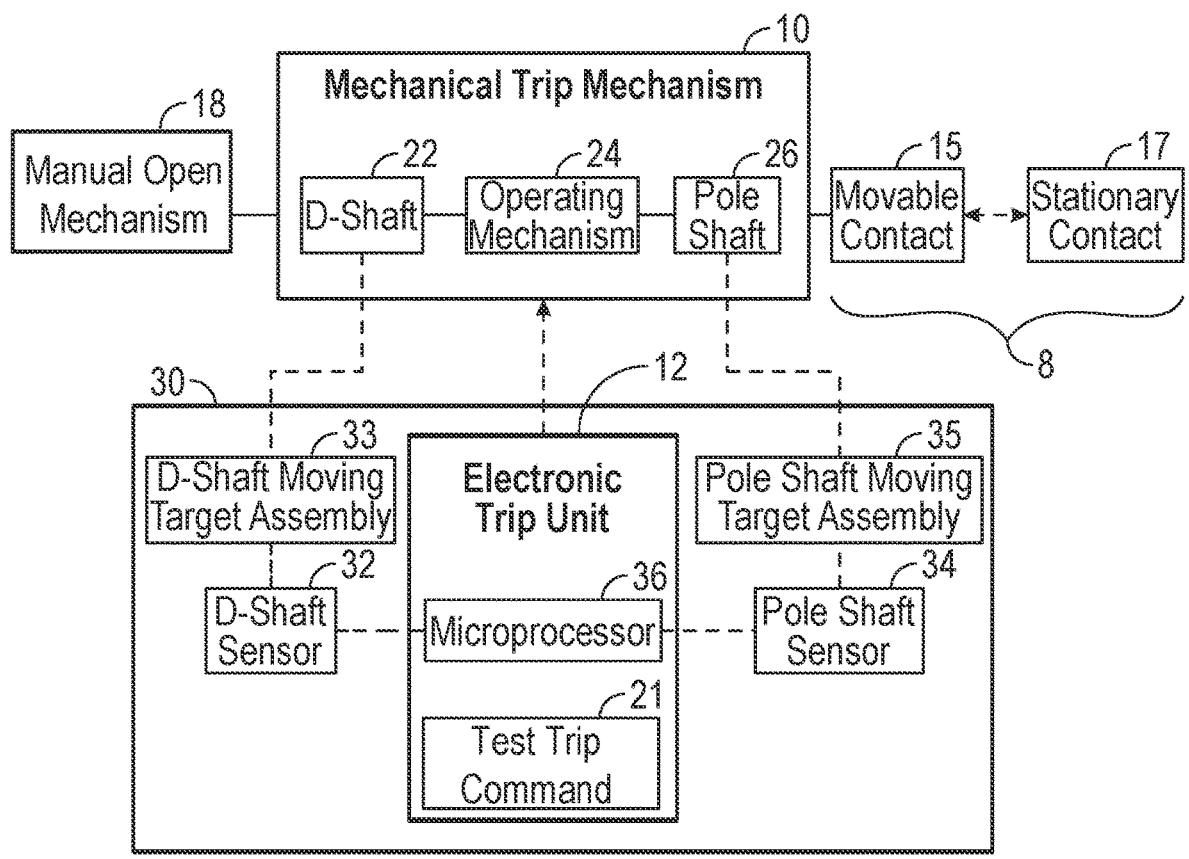
FIG. 2 is a schematic diagram of a diagnostic system for monitoring a mechanical trip mechanism depicted in FIG. 1, in accordance with an example embodiment of the disclosed concept.

Referring now to FIG. 2, the mechanical trip mechanism 10 depicted in FIG. 1 is depicted schematically in more detail, and a diagnostic system 30 for monitoring the performance of the mechanical trip mechanism 10 is depicted schematically, in accordance with exemplary embodiments of the disclosed concept. FIGS. 3-6 show various isometric views of the circuit interrupter 1 that is schematically depicted in FIG. 1, and the mechanical trip mechanism 10 and disclosed diagnostic system 30 are explained using FIG. 2 in conjunction with FIGS. 3-6. The schematic depiction in FIG. 2 is used to provide a simplified depiction of the interaction between various components of the mechanical trip mechanism 10 and diagnostic system 30, as the circuit interrupter 1 comprises many overlapping components that can make it challenging to visually discern the interaction between various components, even with the isometric views of FIGS. 3-6.

Figure 3:
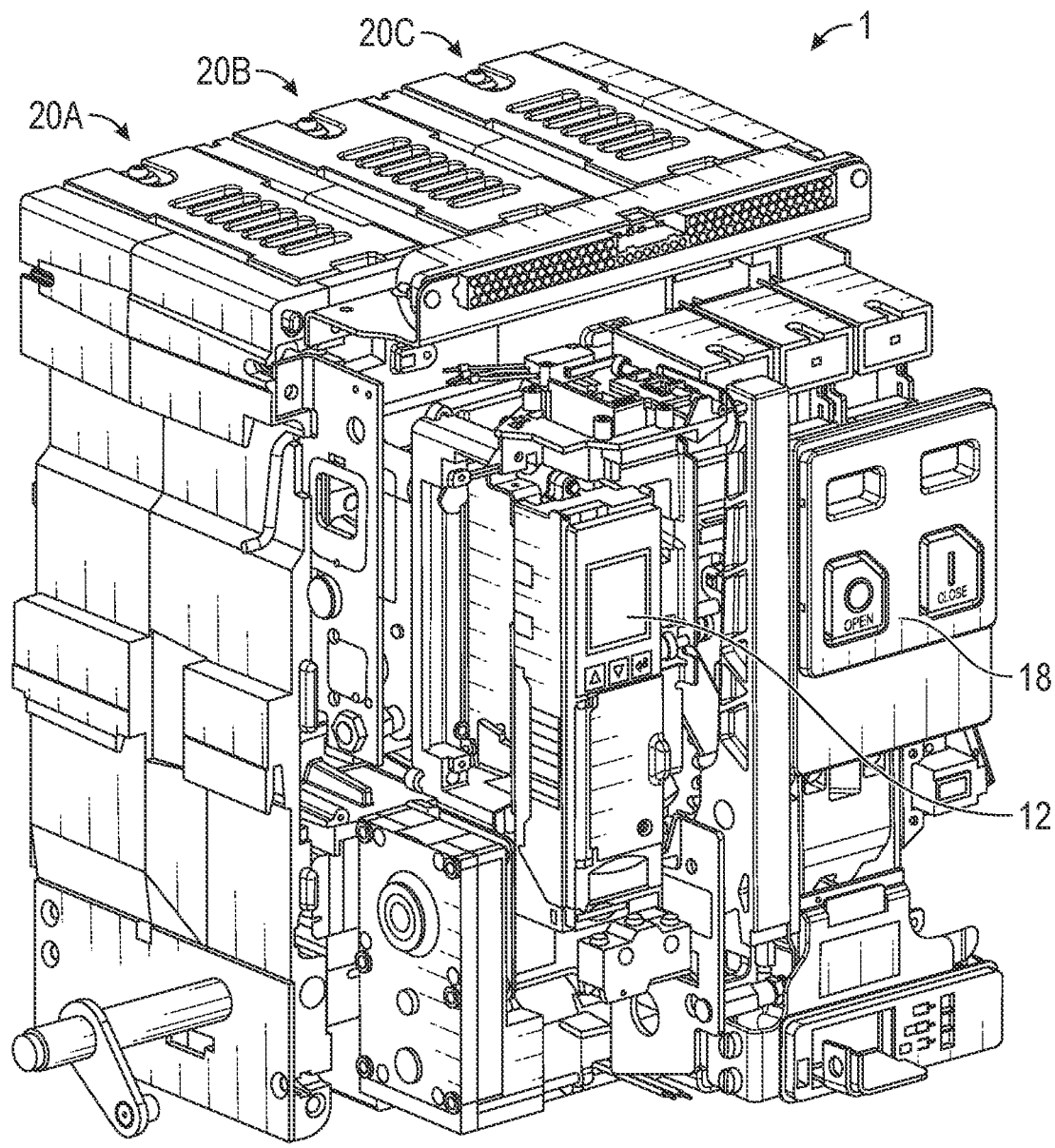
FIG. 3 is an isometric view of the exterior of a 3-pole circuit interrupter, in accordance with an example embodiment of the disclosed concept.

The circuit interrupter 1 is shown in FIGS. 3-6 as a 3-pole interrupter. As labeled in FIG. 3, each of the three individual poles can be identified by a unique reference number 20A, 20B, or 20C. In addition, the poles can collectively be referred to as the poles 20, and any one of the poles can be referred to generally as a pole 20. While FIG. 3 shows all three poles 20, it is noted that FIGS. 4-6 hide several features of two of the poles 20 in order to make the features of the visible pole 20 easier to discern. It will be appreciated that the hidden features of the other two poles are functionally identical to the features shown in FIGS. 4-6.

Figure 4:
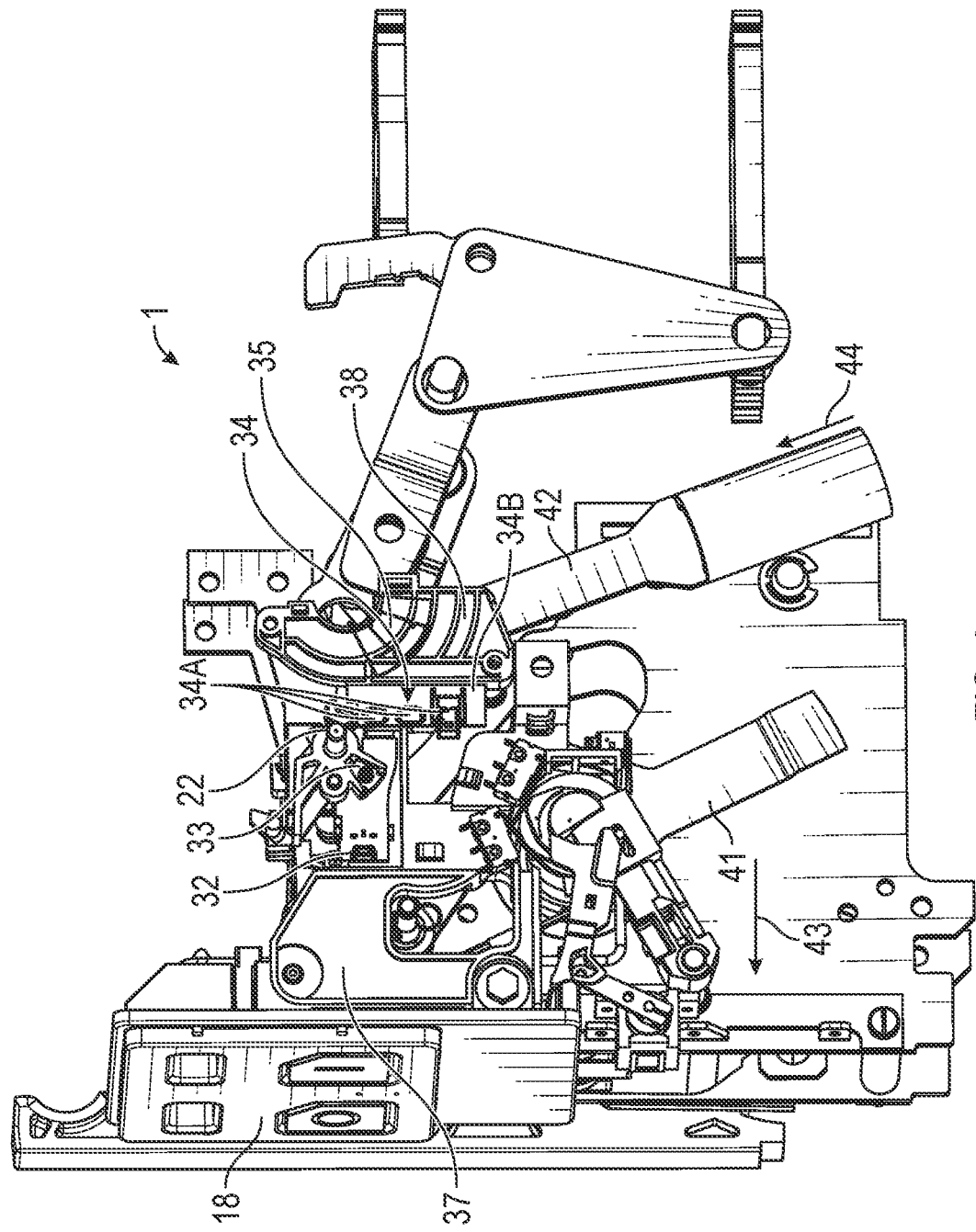
FIG. 4 is a side view of the circuit interrupter shown in FIG. 3, depicting the circuit interrupter in a closed state, in accordance with an example embodiment of the disclosed concept.
Figure 5:
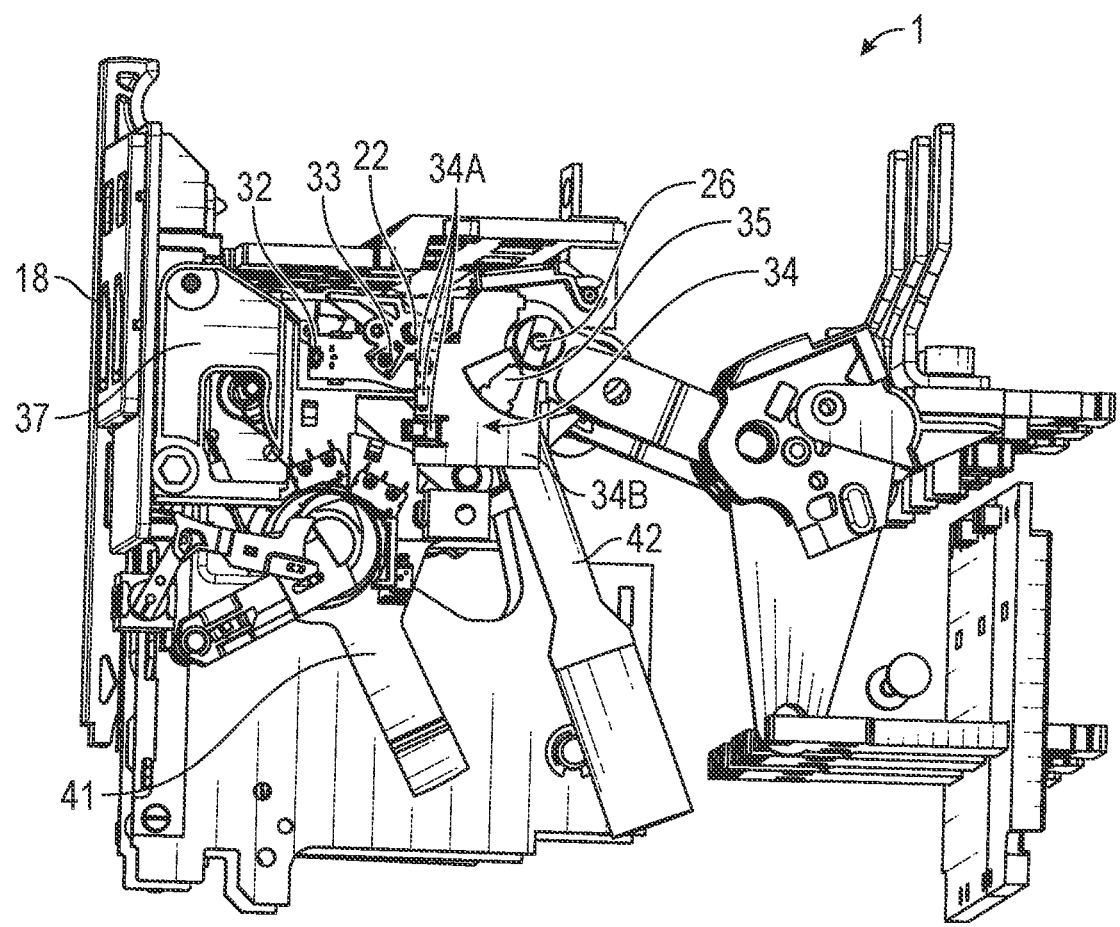
FIG. 5 is an alternate side view of the circuit interrupter shown in FIG. 3, hiding certain components shown in FIG. 4 and showing some components not shown in FIG. 4, depicting the circuit interrupter shortly after an opening operation has commenced, in accordance with an example embodiment of the disclosed concept.
Figure 6:
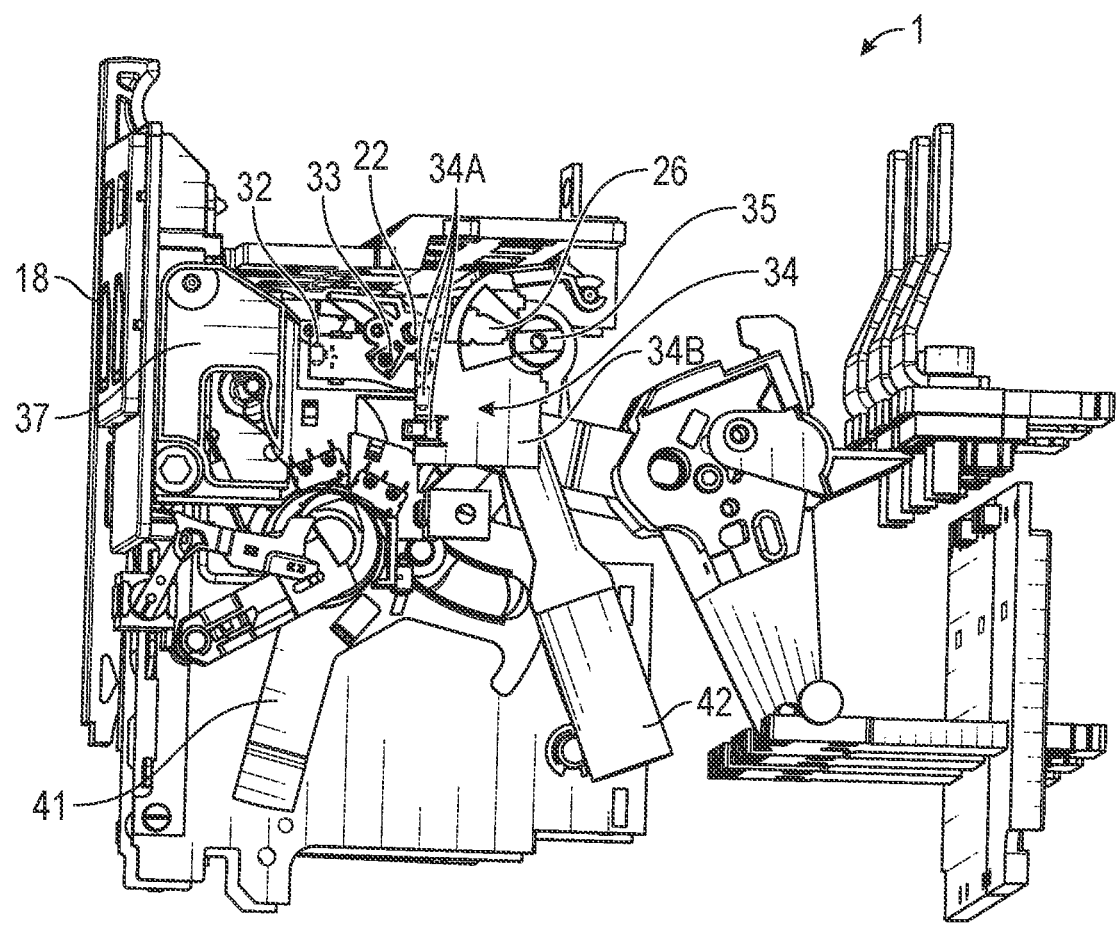
FIG. 6 shows the same side view shown in FIG. 5, depicting the circuit interrupter in an open state after an opening operation has been completed, in accordance with an example embodiment of the disclosed concept.

FIG. 3 shows the three-pole circuit interrupter 1 with its exterior housing intact. FIG. 4 and FIG. 5 both show a side view of the circuit interrupter 1, with most of the exterior housing removed, with FIG. 4 depicting the circuit interrupter 1 in a closed state, i.e. a state in which the separable contacts 8 are closed, and with FIG. 5 depicting the circuit interrupter 1 shortly after an opening operation has commenced to open the separable contacts 8 from the closed state. As detailed further later herein, FIG. 4 and FIG. 5 show several of the same components, but each of FIG. 4 and FIG. 5 also shows and hides some components that are not shown or hidden in the other figure. FIG. 6 also shows a side view of the circuit interrupter 1, with most of the exterior housing removed, and depicts the circuit interrupter 1 in an open state, i.e. a state in which the separable contacts 8 are open as a result of separating during an opening operation. A manual open mechanism 18 is labeled in each of FIGS. 3, 4, 5, and 6, and can be used to determine the orientation of each of those figures relative to one another. The manual open mechanism 18 is used to manually open the separable contacts 8 when the circuit interrupter 1 needs to be taken out of service for any reason, such as to perform maintenance.

The functioning of the mechanical trip mechanism 10 will now be detailed in conjunction with FIG. 2, with further detailing of FIGS. 4-6 provided later herein to explain the functioning of the diagnostic system 30. In FIG. 2, the separable contacts 8 include a movable contact 15 and a stationary contact 17. The mechanical trip mechanism 10 comprises a D-shaft 22, an operating mechanism 24 operably coupled to the D-shaft 22, and a pole shaft 26 operably coupled to the operating mechanism 24. The D-shaft 22 and pole shaft 26 are also labeled in FIGS. 4-6. When operating conditions in the circuit interrupter 1 are normal, the separable contacts 8 are closed so that power can flow between the power source 2 and the load 3. The position in which the D-shaft 22 is disposed when the separable contacts 8 are closed can be referred to as the closed position of the D-shaft 22, and the position in which the pole shaft 26 is disposed when the separable contacts 8 are closed can be referred to as the closed position of the pole shaft 26.

Upon detection of a trip condition, the trip unit 12 transmits a signal that causes the mechanical trip mechanism 10 to open the separable contacts 8. Specifically, the signal transmitted by the trip unit 12 initiates rotation of the D-shaft 22 in a first direction (e.g. clockwise or counterclockwise) that can be referred to as the opening direction for the D-shaft. The operating mechanism 24 is an assembly comprising a plurality of mechanical components, and rotation of the D-shaft 22 in its opening direction causes the operating mechanism 24 to rotate the pole shaft 26 in a first direction that can be referred to as the opening direction for the pole shaft (e.g. clockwise or counterclockwise). The pole shaft 26 is operably coupled to the movable contact 15, and rotation of the pole shaft 26 in its opening direction causes the movable contact 15 to physically separate from the stationary contact 17. The position in which the D-shaft 22 is disposed when the separable contacts 8 are open can be referred to as the open position of the D-shaft 22, and the position in which the pole shaft 26 is disposed when the separable contacts 8 are open can be referred to as the open position of the pole shaft 26.

Referring now to the electronic trip unit 12 in FIG. 2, it is noted that the circuit interrupter 1 additionally comprises test trip functionality, as is typical for circuit interrupters. As shown in FIG. 2, the trip test functionality is included in the trip unit 12 as a trip test command 21. It should be understood that the test trip command 21 enables a user to initiate the simulation of a trip condition in order to test the performance of the mechanical trip mechanism 10. The test trip command 21 can comprise, for example and without limitation, a button on the exterior of the circuit interrupter 1 that a user can actuate by pushing. It is noted that the same sequence of steps detailed above for opening the separable contacts 8 with the mechanical trip mechanism 10 under a trip condition also applies when a test trip is initiated by the test trip command 21. It is further noted that actuating the manual open mechanism 18 initiates rotation of the D-shaft 22 in its opening direction, and that the remainder of the sequence detailed above also applies when an opening operation is initiated by actuating the manual open mechanism 18.

When it is time to re-close the separable contacts 8, the trip unit 12 transmits a signal that initiates rotation of the D-shaft 22 in a second direction that can be referred to as the closing direction for the D-shaft 22, i.e. the direction that is opposite of the opening direction for the D-shaft 22. Rotation of the D-shaft 22 in its closing direction causes the operating mechanism 24 to rotate the pole shaft 26 in a second direction that can be referred to as the closing direction for the pole shaft 26, i.e. the direction that is opposite of the opening direction for the pole shaft 26. Rotation of the pole shaft 26 in its closing direction causes the movable contact 15 to move toward the stationary contact 17 until the movable contact 15 and stationary contact 17 are closed, i.e. in physical contact with one another, such that power can flow through the contacts 15, 17.

Still referring to FIG. 2 and with additional reference to FIGS. 4-6, the diagnostic system 30 will now be explained. The diagnostic system 30 comprises a D-shaft sensor 32, a D-shaft movement detection assembly 33, a pole shaft sensor 34, a pole shaft moving target assembly 35, and a microprocessor 36 (not visible in FIGS. 4-6 and labeled only in FIG. 2), with the microprocessor 36 being configured to receive the outputs of the D-shaft sensor 32 and the pole shaft sensor 34. It is noted that the pole shaft sensor assembly 34 comprises a number of individual sensors 34A fixed to a bracket 34B. While three individual sensors 34A are shown in FIGS. 4-6, the pole shaft sensor assembly 34 can include fewer or more than three individual sensors 34A without departing from the scope of the disclosed concept. In an exemplary embodiment of the disclosed concept, the microprocessor 36 is a component of the trip unit 12. A D-shaft sensor mounting bracket 37 is included in the circuit interrupter 1 in order to maintain the D-shaft sensor 32 and its accompanying circuit assembly in a fixed position. As previously noted, FIG. 4 shows some components that are hidden in FIG. 5, and one such component is a pole shaft sensor housing 38 that is included in the circuit interrupter 1 in order to maintain the pole shaft sensor assembly 34 and its accompanying circuitry in a fixed position. It is noted that the pole shaft 26 is obscured by the pole shaft sensor housing 38 in FIG. 4, but is visible in FIG. 5 and FIG. 6.

FIG. 4 shows the circuit interrupter 1 when the separable contacts 8 are fully closed, while FIG. 5 shows the circuit interrupter 1 shortly after an opening operation has commenced, as can be discerned from slight differences in the position of an interlock arm 41 between FIG. 4 and FIG. 5, as well as from slight differences in the position of an opening spring arm 42 between FIG. 4 and FIG. 5. FIG. 6 shows the circuit interrupter 1 when the separable contacts 8 are fully open, i.e. such that the movable contact 15 has traveled its maximum travel distance. When the separable contacts 8 are closed, the interlock arm 41 and opening spring arm 42 are disposed in the positions shown in FIG. 4. Once an opening operation commences, the interlock arm 41 travels in the direction indicated by arrow 43 in FIG. 4 until it reaches the position shown in FIG. 6, and the opening spring arm 42 travels in the direction indicated by arrow 44 in FIG. 4 until it reaches the position shown in FIG. 6.

As an initial matter, it is noted that the D-shaft 22 comprises a flat, circular head, and that the circular head is the component of the D-shaft 22 that is visible in FIGS. 4-6. Accordingly, although FIG. 6 depicts the circuit interrupter 1 after the D-shaft 22 has rotated relative to FIGS. 4 and 5, the rotation of the D-shaft 22 cannot be discerned from the views shown in FIGS. 4-6, since the axis of rotation of the D-shaft 22 coincides with the center of the flat, circular head. The D-shaft sensor 32 is an inductive sensor, and the D-shaft movement detection assembly 33 comprises a metal target. The D-shaft 22 is operably connected to a microswitch (not visible in the figures), and the D-shaft movement detection assembly 33 is also operably connected to the microswitch.

It is noted that a microswitch is structured to be connected along a path of power flow and structured to switch between a first state and a second state, such that when the microswitch is disposed in the first state, power is able to flow through the microswitch along a first path, and when the microswitch is disposed in the second state, power is able to flow through the microswitch in a second path that is distinct from the first path. In circuit interrupter 1, the microswitch is connected along a path of power flow and is positioned relative to the D-shaft 22 such that rotation of the D-shaft 22 in the opening direction (i.e. from the D-shaft closed position to the D-shaft open position) actuates the microswitch to switch from the first state to the second state. The metal target of the D-shaft movement detection assembly 33 is operably connected to the microswitch such that the change in the state of the microswitch effected by the rotation of the D-shaft 22 in its opening direction causes a change in a signal output by the metal target. The change in the output of the detection assembly 33 metal target disrupts the electromagnetic field of the D-shaft sensor 32 and causes the D-shaft sensor 32 to produce an output received by the microprocessor 36.

The pole shaft sensor 34 is also an inductive sensor, and the pole shaft moving target assembly 35 also comprises a metal target. The pole shaft moving target assembly 35 is fixedly coupled to the pole shaft 26 such that rotation of the pole shaft 26 from its closed position to its open position causes corresponding movement of the moving target assembly 35, including the metal target. The movement of the metal target disrupts the electromagnetic field of the pole shaft sensor 34 and causes the sensor 34 to produce an output received by the microprocessor 36.

It will be appreciated that trip units often comprise multiple microprocessors and controllers dedicated to different functions. The microprocessor 36 can be referred to as the diagnostic microprocessor 36 of the trip unit, while a separate microprocessor (not numbered or shown in the figures) is used to monitor trip conditions of the circuit interrupter 1. The various microprocessors and controllers of the trip unit 12 are in electrical communication with one another such that the diagnostic microprocessor 36 can be notified when the trip unit 12 is initiating a trip, and such that the diagnostic microprocessor 36 transmits the data it receives from the D-shaft sensor 32 and from the pole shaft sensor 34 to the memory of the trip unit 12.

When the circuit interrupter 1 is in service, the microprocessor 36 continuously checks the output of the D-shaft sensor 32 and the output of the pole shaft sensor 34. The microprocessor 36 is configured to know what reading from the D-shaft sensor 32 and what reading from the pole shaft sensor 34 indicate that the D-shaft 22 and the pole shaft 26, respectively are in the closed position (i.e. such that the separable contacts 8 are closed). The microprocessor 36 is also configured to know what reading from the D-shaft sensor 32 and what reading from the pole shaft sensor 34 indicate that the D-shaft 22 and the pole shaft 26, respectively, are in the open position (i.e. such that the separable contacts 8 are open). Thus, when the D-shaft 22 begins to rotate due to initiation of a trip by the trip unit 12 or due to initiation of a manual opening operation by actuation of the manual open mechanism 18, the microprocessor 36 is able to detect when the D-shaft 22 has begun to rotate away from its closed position based on the change in output of the D-shaft sensor 32. In addition, the microprocessor 36 is able to detect when the pole shaft 26 has reached its open position. The microprocessor 36 time stamps the time at which the D-shaft 22 begins rotating toward its open position and time stamps the time at which the pole shaft 26 reaches its open position. The microprocessor 36 then calculates how much time elapsed between the two timestamps, which can be referred to as the "mechanism performance time" for a given opening operation of the circuit interrupter 1.

The microprocessor 36 communicates the mechanism performance time to the memory of the trip unit 12. As used herein, the term "functional failure" is used to denote that the mechanical trip mechanism 10 is still capable of opening the separable contacts 8, but that the mechanism performance time is unacceptably slow. After the trip unit 12 memory receives the mechanism performance time, the trip unit 12 compares the mechanism performance time to a predefined acceptable time limit, with a mechanism performance time exceeding the predefined time limit being indicative of functional failure. If the mechanism performance time exceeds the predefined time limit, the trip unit 12 will transmit a signal to a user interface (which can be located either locally in the circuit interrupter 1 or remotely, or both) indicating that the mechanical trip mechanism 10 needs to be taken out of operation and serviced before being put back into operation. In addition, the trip unit 12 stores each mechanism performance time received and maintains a log of all received mechanism performance times so that each new mechanism performance time can be compared to the preceding mechanism performance time(s) in order to determine if there is a trend toward performance degradation.

If, however, the mechanism performance time does not exceed the predefined time limit, then the trip unit 12 compares the mechanism performance time to previously stored mechanism performances time using a pre-programmed set of parameters. If the latest mechanism performance time diverges from the preceding mechanism performance time(s) greatly enough, or if there is a significant enough degradation trend among the last several mechanism performance times, the trip unit 12 will transmit a signal to the user interface indicating that the mechanical trip unit 10 is trending toward failure and that servicing is recommended. It will be appreciated that it is likely to take less time and resources to service the mechanical trip unit 10 at this stage, i.e. prior to functional failure, than after functional failure, as the damage is less likely to become severe or widespread. The trip unit 12 can also be configured to transmit the stored performance mechanism times to a data cloud, so that trends among the same or similar models of circuit interrupters 1 can be identified. It is expected that the mechanism performance time is most likely to be reflective of the performance of the operating mechanism 24, rather than of the D-shaft 22 or the pole shaft 26, as the D-shaft 22 and pole-shaft 26 are fairly simple components with fewer opportunities to degrade or break down as compared to the relatively more complex assembly of the operating mechanism 24.

Figure 7:
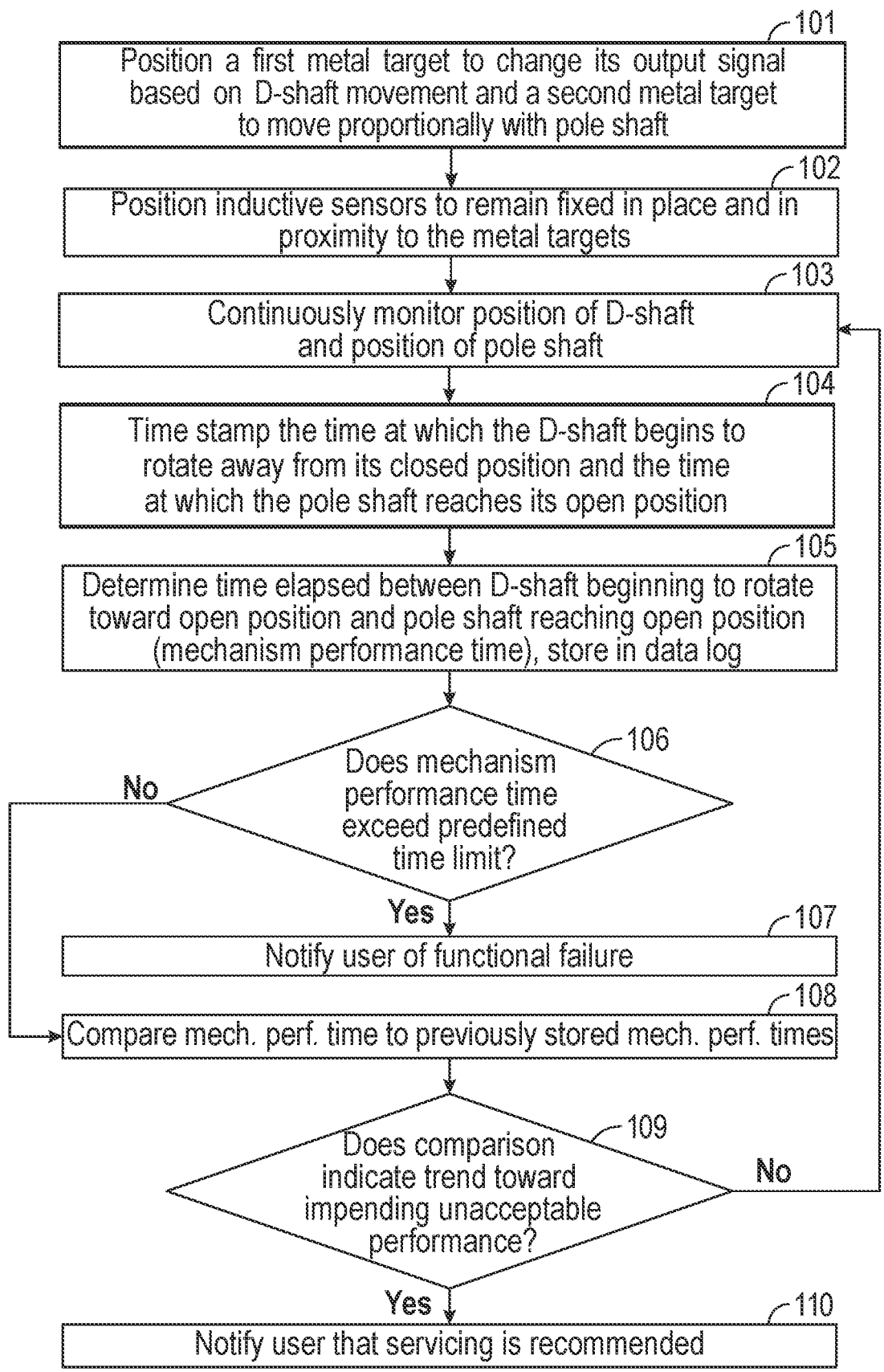
FIG. 7 is a flow chart of a method of monitoring performance of a mechanical trip mechanism of a circuit interrupter, in accordance with an example embodiment of the disclosed concept.

FIG. 7 is a flowchart of a method of monitoring performance of a mechanical trip mechanism during opening operations of a circuit interrupter, in accordance with an example embodiment of the disclosed concept. The method of FIG. 7 may be employed, for example, using the diagnostic system 30 and the mechanical trip mechanism 10 shown in FIGS. 1-6, and is described in conjunction with the diagnostic system 30 and the mechanical trip mechanism 10 shown in FIGS. 1-6. However, it will be appreciated that the method may be employed in other devices as well without departing from the scope of the disclosed concept.

The method 100 begins at 101, where the metal target of the D-shaft movement detection assembly 33 is coupled to the circuit interrupter 1 and positioned to change its output signal based on the movement of the D-shaft 22, and where the metal target of the pole shaft moving target assembly 35 is coupled to the circuit interrupter 1 and positioned to move proportionally relative to the movement of the pole shaft 26. Positioning the metal target of the D-shaft movement detection assembly 33 to change its output signal based on the movement of the D-shaft 22 may comprise, for example and without limitation, operably connecting the D-shaft 22 to a microswitch and also operably connecting the metal target of the D-shaft movement detection assembly 33 to the microswitch, such that rotation of the D-shaft 22 will change the state of the microswitch, and such that a change in the state of the microswitch will cause a change in a signal output by the metal target of the D-shaft movement detection assembly 33. Positioning the metal target of the pole shaft moving target assembly 35 to change its output signal based on the movement of the pole shaft 26 may comprise, for example and without limitation, fixedly coupling the pole shaft moving target assembly 35 to the pole shaft 26 such that rotation of the pole shaft 26 from its closed position to its open position causes corresponding movement of the moving target assembly 35, including the metal target.

At 102, the inductive D-shaft sensor 32 is fixedly positioned in the circuit interrupter 1 in sufficient proximity to the D-shaft movement detection assembly 33 to enable the D-shaft sensor 32 to detect changes in the output of the metal target of the D-shaft movement detection assembly 33. Additionally, the inductive pole shaft sensor 34 is fixedly positioned in the circuit interrupter 1 in sufficient proximity to the pole shaft moving target assembly 35 to enable the pole shaft sensor 34 to detect movement of the metal target of the pole shaft moving target assembly 35. At 103, the microprocessor 36 starts to continuously monitor the position of the D-shaft 22 and pole shaft 26, for example by continuously reading the output of the D-shaft sensor 32 and the output of the pole shaft sensor 34. At 104, the microprocessor 36 time stamps the time at which the D-shaft 22 begins to rotate away from its closed position, and subsequently time stamps the time at which the pole shaft 26 reaches its open position.

Continuing to refer to FIG. 7, at 105, the microprocessor 36 determines the mechanism performance time by using the time stamps generated at step 104 to calculate the time that elapsed between the D-shaft 22 reaching its open position and the pole shaft 26 reaching its open position, and transmits the mechanism performance time to the memory of the trip unit 12, which stores the mechanism performance time in a data log. At 106, the trip unit 12 compares the mechanism performance time to a predefined acceptable time limit. If the mechanism performance time exceeds the predefined acceptable time limit, then the method 100 proceeds to 107, wherein the trip unit 12 transmits a message to notify the user that mechanical trip mechanism 10 has functionally failed and needs to be taken out of operation and serviced before being put back into operation.

If it is determined at 106 that the mechanism performance time does not exceed the predefined acceptable time limit, then the method 100 proceeds to 108 and compares the current mechanism performance time to past mechanism performance times stored in the data log. At 109, the trip unit 12 uses a set of preprogrammed parameters to determine how closely the mechanical trip mechanism 10 is trending toward having an unacceptable mechanism performance time. If the analyzed mechanism performance times are deemed to be trending too closely toward failure according to the preprogrammed parameters, then the method proceeds to 110, and the trip unit 12 notifies the user that servicing is recommended due to degrading performance of the mechanical trip mechanism 10. If the analyzed mechanism performance times are not trending toward failure according to the preprogrammed parameters, then the method returns to 103.

In addition to preventing damage from becoming more severe or widespread by identifying degradation in performance of the mechanical trip mechanism 10 prior to functional failure, the diagnostic system 30 and method 100 disclosed herein provide other improvements over existing performance monitoring systems. In particular, existing performance monitoring systems for mechanical trip mechanisms often rely on monitoring the current flowing through the circuit interrupter 1 to determine when the separable contacts 8 have actually opened in order to determine how well the mechanical trip mechanism 10 is performing. Relying on current flow to determine when the separable contacts 8 have opened is significantly less accurate for determining the performance of the individual components of the mechanical trip mechanism 10 than the diagnostic system 30 and method 100 disclosed herein are. In addition, the diagnostic system 30 and method 100 disclosed herein can be used to determine the performance of the mechanical trip mechanism 10 even when there is no flow of current through the circuit interrupter 1, such as during a test trip executed by the test trip command 21 or during a manual opening of the separable contacts 8 by actuation of the manual open mechanism 18.

While specific embodiments of the invention have been described in detail, it will be appreciated by those skilled in the art that various modifications and alternates to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A circuit interrupter structured to be electrically connected between a power source and a load, the circuit interrupter comprising:
    a pair of separable contacts comprising a stationary contact and a movable contact disposed between the power source and the load;
    a trip unit configured to detect trip conditions;
    a mechanical trip mechanism, the mechanical trip mechanism comprising:
        a D-shaft structured to be actuated by the trip unit;
        an operating mechanism structured to be actuated by the D-shaft; and
        a pole shaft structured to be actuated by the operating mechanism and to move the movable contact between a closed position and an open position; and
    a diagnostic system for monitoring the performance of the mechanical trip mechanism, the diagnostic system comprising:
        a D-shaft sensor structured to track a position of the D-shaft;
        a pole shaft sensor structured to track a position of the pole shaft; and
        a microprocessor in electrical communication with the D-shaft sensor and the pole shaft sensor, wherein, for each opening operation of the circuit interrupter that moves the movable contact from a closed state to an open state, the microprocessor is configured to:
- time stamp a first time at which the D-shaft begins moving to its open position, based on an output of the D-shaft sensor,
- time stamp a second time at which the pole shaft reaches its open position, based on an output of the pole shaft sensor,
- determine a mechanism performance time of the mechanical trip mechanism by subtracting the first time from the second time,
- transmit the mechanism performance time to the trip unit, and
- determine whether or not the circuit interrupter requires servicing based on the mechanism performance time.

2. The circuit interrupter of claim 1, wherein the microprocessor is configured to continuously read the D-shaft sensor and the pole shaft sensor when the circuit interrupter is in service.

3. The circuit interrupter of claim 1,
wherein the microprocessor is configured to transmit the mechanism performance time to a memory of the trip unit,
wherein the trip unit is configured to, upon receiving the mechanism performance time, compare the mechanism performance time to a predefined time limit,
wherein the trip unit is configured to notify a user that the mechanical trip mechanism needs to be serviced if the mechanism performance time exceeds the predefined time limit.

4. The circuit interrupter of claim 3,
wherein, when the trip unit receives the mechanism performance time, the trip unit identifies the mechanism performance time as a current mechanism performance time,
wherein the trip unit is configured to store past mechanism performance times associated with past opening operations,
wherein the trip unit is configured to compare the current mechanism performance time with the stored past mechanism performance times in order to determine if there is a trend toward failure of the mechanical trip mechanism,
wherein the trip unit is configured to notify the user that service of the mechanical trip mechanism is recommended if the trip unit determines that the trend toward failure is present.

5. The circuit interrupter of claim 1, further comprising:
a manual open mechanism operably connected to the mechanical trip mechanism and structured to enable a user to manually initiate an opening operation,
wherein the trip unit comprises a test trip command structured to be actuated by a user in order to simulate a trip condition that initiates an opening operation,
wherein the diagnostic system is configured to determine the mechanism performance time regardless of whether a given opening operation is initiated due to detection of an actual trip condition by the trip unit, due to actuation of the test trip command, or due to actuation of the manual open mechanism.

6. The circuit interrupter of claim 1, wherein the diagnostic system further comprises:
a D-shaft metal target positioned such that movement of the D-shaft causes a change in a signal output by the D-shaft metal target; and
a pole shaft metal target positioned such that movement of the pole shaft causes corresponding movement of the pole shaft metal target,
wherein the D-shaft sensor is an inductive sensor, and wherein the D-shaft sensor is positioned such that the change in the signal output by the D-shaft metal target alters an electromagnetic field of the D-shaft sensor and causes the D-shaft sensor to produce a D-shaft position output, and
wherein the pole shaft sensor is an inductive sensor, and wherein the pole shaft sensor is positioned such that movement of the pole shaft metal target alters an electromagnetic field of the pole shaft sensor and causes the pole shaft sensor to produce a pole shaft position output.

7. The circuit interrupter of claim 1,
wherein the diagnostic system is structured to determine the mechanism performance time regardless of whether or not current is flowing through the circuit interrupter.

8. A method of monitoring performance of a mechanical trip mechanism during opening operations of a circuit interrupter, the method comprising:
positioning a D-shaft sensor to track a position of a D-shaft of the mechanical trip mechanism;
positioning a pole shaft sensor to track a position of a pole shaft of the mechanical trip mechanism;
time stamping, with a microprocessor, a first time at which the D-shaft begins moving from its closed position to its open position;
time stamping, with the microprocessor, a second time at which the pole shaft reaches its open position;
determining, with the microprocessor, a mechanism performance time of the mechanical trip mechanism by subtracting the first time from the second time; and
determining, with a trip unit of the circuit interrupter, whether or not the circuit interrupter requires servicing based on the mechanism performance time,
wherein the D-shaft is configured to be actuated by the trip unit upon detection of a trip condition by the trip unit,
wherein an operating mechanism of the mechanical trip mechanism is configured to be actuated by the D-shaft,
wherein the pole shaft is configured to be actuated by the operating mechanism,
wherein the pole shaft is configured to open separable contacts of the circuit interrupter, and
wherein the separable contacts are structured to be closed when the D-shaft is in its closed position and structured to be open when the pole shaft is in its open position.

9. The method of claim 8, further comprising:
continuously reading the D-shaft sensor and the pole shaft sensor with the microprocessor when the circuit interrupter is in service.

10. The method of claim 8, further comprising:
transmitting the mechanism performance time to the trip unit;
comparing, using the trip unit, the mechanism performance time to a predefined time limit; and
notifying a user that the mechanical trip mechanism needs to be serviced if the mechanism performance time exceeds the predefined time limit.

11. The method of claim 10, further comprising:
identifying, with the trip unit, the received mechanism performance time as a current mechanism performance time;
storing past mechanism performance times associated with past opening operations in a data log;

comparing the current mechanism performance time with the stored past mechanism performance times in order to determine if there is a trend toward failure of the mechanical trip mechanism; and notifying the user that service of the mechanical trip mechanism is recommended if the trip unit determines that the trend toward failure is present.

12. The method of claim 8,
wherein the D-shaft is further configured to be actuated by a test trip command of the trip unit that enables a user to simulate a trip condition,
wherein the D-shaft is further configured to be actuated by a manual open mechanism that is structured to enable a user to manually initiate an opening operation, and
wherein the mechanism performance time is determined regardless of whether the D-shaft is actuated due to detection of an actual trip condition by the trip unit, due to actuation of the test trip command, or due to actuation of the manual open mechanism.

13. The method of claim 8, further comprising:
positioning a D-shaft metal target in relation to the D-shaft so that movement of the D-shaft will cause a change in a signal output by the D-shaft metal target; and
positioning a pole shaft metal target so that movement of the pole shaft will cause corresponding movement of the pole shaft metal target,
wherein the D-shaft sensor is an inductive sensor, and wherein the change in the signal output by the D-shaft metal target alters an electromagnetic field of the D-shaft sensor and causes the D-shaft sensor to produce a D-shaft position output, and
wherein the pole shaft sensor is an inductive sensor, and wherein movement of the pole shaft metal target alters an electromagnetic field of the pole shaft sensor and causes the pole shaft sensor to produce a pole shaft position output.

14. The method of claim 8,
wherein the mechanism performance time is determined regardless of whether or not current is flowing through the circuit interrupter.

15. A diagnostic system for monitoring performance of a mechanical trip mechanism of a circuit interrupter, with the mechanical trip mechanism comprising: a D-shaft structured to be actuated by a trip unit; an operating mechanism structured to be actuated by the D-shaft; and a pole shaft structured to be actuated by the operating mechanism and to separate a moving separable contact from a stationary separable contact, the diagnostic system comprising:
a D-shaft sensor structured to be fixedly positioned in proximity to the D-shaft and to track a position of the D-shaft;
a pole shaft sensor structured to be fixedly positioned in proximity to the pole shaft and to track a position of the pole shaft; and
a microprocessor in electrical communication with the D-shaft sensor and the pole shaft sensor,
wherein, for each opening operation of the circuit interrupter, the microprocessor is configured to:
time stamp a first time at which the D-shaft begins rotating to its open position,
time stamp a second time at which the pole shaft reaches its open position,
determine a mechanism performance time of the mechanical trip mechanism by subtracting the first time from the second time, and
transmit the mechanism performance time to the trip unit to enable the trip unit to determine whether or not the circuit interrupter requires servicing based on the mechanism performance time.

16. The diagnostic system of claim 15,
wherein the microprocessor is configured to continuously read the D-shaft sensor and the pole shaft sensor when the circuit interrupter is in service.

17. The diagnostic system of claim 15, further comprising:
a manual open mechanism operably connected to the mechanical trip mechanism and structured to enable a user to manually initiate an opening operation,
wherein the trip unit comprises a test trip command structured to be actuated by a user in order to simulate a trip condition that initiates an opening operation,
wherein the diagnostic system is configured to determine the mechanism performance time regardless of whether a given opening operation is initiated due to detection of an actual trip condition by the trip unit, due to actuation of the test trip command, or due to actuation of the manual open mechanism.

18. The diagnostic system of claim 15, wherein the diagnostic system further comprises:
a D-shaft metal target positioned such that movement of the D-shaft causes a change in a signal output by the D-shaft metal target; and
a pole shaft metal target positioned such that movement of the pole shaft causes corresponding movement of the pole shaft metal target,
wherein the D-shaft sensor is an inductive sensor, and wherein the D-shaft sensor is positioned such that the change in the signal output by the D-shaft metal target alters an electromagnetic field of the D-shaft sensor and causes the D-shaft sensor to produce a D-shaft position output, and
wherein the pole shaft sensor is an inductive sensor, and wherein the pole shaft sensor is positioned such that movement of the pole shaft metal target alters an electromagnetic field of the pole shaft sensor and causes the pole shaft sensor to produce a pole shaft position output.

19. The diagnostic system of claim 15,
wherein the diagnostic system is structured to determine the mechanism performance time regardless of whether or not current is flowing through the circuit interrupter.

* * * * *